Patented Oct. 25, 1932

1,884,118

UNITED STATES PATENT OFFICE

ALEXANDER WILLIAM MORTON, OF BALACLAVA, VICTORIA, AUSTRALIA, ASSIGNOR TO CHARLES COLUMBINE JACKSON, OF MELBOURNE, AUSTRALIA

PROCESS OF RECONDITIONING OLD RUBBER

No Drawing. Application filed October 19, 1928, Serial No. 313,651, and in Australia May 31, 1928.

This invention relates to a process of treating old vulcanized rubber to restore or revive its original properties whereby it may be re-used in manufactures.

According to my invention old vulcanized rubber, such as that obtained from discarded motor tires, is first reduced to crumb or finely divided state and a quantity of sulphur is then thoroughly admixed therewith. The amount of added sulphur is ordinarily three-quarters of an ounce avoirdupois per pound of old rubber crumb, but this proportion may be varied, depending chiefly upon the variety and condition of the old rubber being treated at any particular time.

The sulphur and rubber mixture is now treated with a small amount of a liquid mixture consisting essentially of benzine, carbon bisulphide, and carbon tetrachloride, amounting to only a small percent of the weight of the rubber, e. g. around 5% or less. The proportions of the ingredients in the liquid mixture also vary according to the condition and composition of the old rubber being treated.

For example in treating old rubber obtained from tire covers manufactured from stock of the general composition now hereunder stated:—

|  | Pounds |
|---|---|
| Plantation crepe rubber | 25 |
| Litharge | 2½ |
| Sulphur | 5 |
| Zinc oxide | 25 |
| Slaked lime | ½ |
| Magnesia | 1½ |
| Antimony oxide | 1 |

I use four drams of benzine, one dram of carbon bisulphide, and one dram of carbon tetrachloride for each pound weight of crumb rubber and sulphur mixture.

For higher grade rubbers such as old pneumatic tire tubes manufactured from stock of the general composition now expressed:—

|  | Pounds |
|---|---|
| Plantation crepe rubber | 12½ |
| Smoked sheet | 12½ |
| Sulphur | 6 |
| Litharge | 6 |
| Zinc oxide | 5 |
| Slaked lime | ¼ |
| Crimson antimony | 2 |

I use half quantities of the liquid mixture, i. e., two drams of benzine, one-half dram of carbon bisulphide and one-half dram of carbon tetrachloride for each pound weight of rubber and sulphur mixture. Should, however, the rubber be hardened through age, I may use larger quantities, e. g., four drams of benzine, one dram of carbon bisulphide and one dram of carbon tetrachloride for each pound of rubber and sulphur mixture.

In some cases the quantity of carbon tetrachloride in the liquid mixture is inversely proportional to the percentage of pure rubber in the material undergoing treatment. Thus old tire tubes which contain more pure rubber than tire covers would require less carbon tetrachloride.

The present invention is of more or less general application to old vulcanized rubber of various kinds and compositions such as the tread stocks of pneumatic tires, solid tread stocks, inner tube stocks and various other rubber compounds. It can be applied to rubber compounds containing various compounding materials and in the case of automobile tires, etc. containing canvas mixed with the rubber the entire mixture of canvas and rubber can be ground up and used in the present process.

The old rubber can be ground up and used without admixtures of other compounding materials, other than sulphur and the liquid mixture and when this is done it is possible to obtain revulcanized products comparable with or superior to the original vulcanized products. For example, using an old solid rubber tire and grinding it up and treating it according to the present process, I have obtained on revulcanization a reconditioned rubber superior to the original tread when subjected to tests on water absorption, impact and wear and a product approximately equal in resiliency.

Instead of using the ground up rubber without the addition of other compounding materials, various compounding materials may be employed. For example, finely divided scrap leather, metal filings, pigments, fillers, etc. can be added in varying proportions. Similarly varying amounts of raw rubber can be added and compounded before revulcanization, together with sufficient sulphur, etc. for the raw rubber. The revulcanization can be promoted by the addition of small amounts of accelerators and improved resistance to oxidation can be imparted by the addition of small amounts of anti-oxidant.

In carrying out the present process the old vulcanized rubber, after it is first reduced to a finely divided state and after the small quantity of sulphur is thoroughly admixed, is treated with the liquid mixture above referred to by adding the liquid mixture so that it will be uniformly and thoroughly distributed throughout the finely divided rubber. This can be accomplished by spraying the liquid mixture upon the finely divided rubber, with stirring if necessary to insure uniform distribution. After the proper amount of the liquid mixture has been added and uniformly distributed throughout the mass of finely divided rubber, the mass is preferably enclosed in a closed container and permitted to stand for the necessary time to insure thorough absorption of the liquid mixture by the rubber and modification of the rubber by the liquid mixture. Sufficient opportunity should be given for the liquid mixture to act upon the rubber. A period of several hours is ordinarily desirable, varying somewhat with the fineness of subdivision of the rubber and with the character of the rubber stock. For some rubber stocks a period of about twelve hours is sufficient, but this period of time can be varied.

After the liquid mixture has acted upon the finely divided rubber it is then exposed to the atmosphere, e. g. in the form of a thin layer to permit fumes to pass off from the rubber layer.

The rubber thus treated is now ready for forming into shapes for revulcanization. It can be directly compacted in molds having the shape of the desired vulcanized article and subjected to vulcanization. Instead of directly molding the treated rubber it can be admixed with a softener such as mineral rubber and mixed on a mixing roll and then formed into sheets in the usual way. For example, retreated crumb rubber may be admixed with mineral rubber in the proportions of about forty pounds of crumb rubber to twelve pounds of mineral rubber and the mixture compounded on a hot mixing roll and then sheeted into sheets suitable for use in making vulcanized products of various kinds. When other compounding ingredients are added they can be added on the mixing roll. Similarly when raw rubber and additional sulphur and other compounding ingredients are added they can be added on the mixing roll in accordance with ordinary rubber mill practice.

As an example of the practice of the invention with the addition of raw rubber the following is given:

Forty pounds of crumb rubber made by grinding solid automobile tires to a finely divided state and by adding a small amount of sulphur and treating with the liquid mixture as above described, are compounded with five pounds of crumb rubber similarly prepared from old inner tubes and ten pounds of raw rubber, together with twelve pounds of pitch or mineral rubber and about four pounds of sulphur, and this mixture is compounded on hot mixing rolls and then formed into sheets and used in making articles of various shapes by placing the compound in suitable molds and vulcanizing. In using such a rubber compound a small amount of an accelerator and of an anti-oxidant can be employed to promote the vulcanization and to impart improved age-resisting properties to the revulcanized rubber.

In vulcanizing the restored rubber according to the present invention, the ordinary types of vulcanizing processes can be employed and the vulcanization can in general be carried out under similar conditions of temperature and pressure to those employed in the original vulcanization of similar rubber goods. The optimum conditions of time, temperature, etc. can readily be determined by tests in accordance with standard rubber mill practice.

The revulcanized products produced according to the present invention are comparable in their properties with the original vulcanized rubber and in some cases have improved properties. They are distinguished from ordinary so-called reclaimed rubber which is inferior to the original rubber from which the reclaimed stock is produced. The treatment of the rubber scrap prior to vulcanization does not require the use of heat but the action of the liquid mixture takes place in the cold or at ordinary temperature, thereby avoiding the drastic action of high temperatures on the rubber and retaining in the treated rubber the valuable characteristics of the original stock even where no added crude rubber is incorporated before revulcanization. Some heating of the treated rubber may take place during compounding on the rolls but this will be unobjectionable. The rubber particles are so modified by the treatment to which they are subjected before revulcanization that they combine together on revulcanization to give a vulcanized product comparable with the original vulcanized rubber.

I claim:

1. An improved process of reconditioning old vulcanized rubber which comprises reducing the old rubber to a finely divided state, treating the divided rubber with added sulfur and with a small amount of a liquid mixture comprising benzine, carbon bisulphide and carbon tetrachloride, and subsequently vulcanizing the mass so produced.

2. An improved process of reconditioning old vulcanized rubber which comprises reducing the old rubber to a finely divided state, adding a quantity of sulphur thereto, treating the resultant rubber and sulphur mixture with a small amount of a liquid mixture of benzine, carbon bisulphide and carbon tetrachloride, and subsequently vulcanizing the mass so produced.

3. An improved process of reconditioning old vulcanized rubber as claimed in claim 2, and wherein the liquid mixture consists of about four drams of benzine, one dram of carbon bisulphide, and one dram of carbon tetrachloride per pound weight of rubber and sulphur mixture.

4. An improved process of reconditioning old vulcanized rubber which comprises reducing the old vulcanized rubber to a finely divided state, adding a quantity of sulphur thereto, spraying the resultant mixture with a liquid mixture consisting essentially of benzine, carbon bisulphide and carbon tetrachloride, and subsequently vulcanizing the mass so produced.

5. An improved process of reconditioning old vulcanized rubber which comprises reducing the old rubber to a finely divided state, incorporating therewith a small percentage of sulphur, treating the divided rubber with a small percentage, around 2 to 5 per cent., of a liquid mixture of benzine, carbon bisulphide and carbon tetrachloride, and permitting such liquid mixture to act upon the divided rubber and subsequently vulcanizing the mass so produced.

6. A revulcanized rubber article, produced by revulcanizing ground vulcanized rubber scrap, said revulcanized article being free from reclaimed and added crude rubber, containing practically the same rubber content as the scrap and having the valuable characteristics of the original vulcanized rubber.

7. A revulcanized rubber article resulting from the treatment of ground vulcanized rubber scrap in the cold with a small percentage of a liquid mixture of benzine, carbon bisulphide and carbon tetrachloride and revulcanization of the treated scrap.

8. An improved process of reconditioning old vulcanized rubber as claimed in claim 2, wherein the amount of sulphur is equal to about 4% of the weight of the old rubber.

In testimony whereof I affix my signature.

ALEXANDER WILLIAM MORTON.